(12) United States Patent
Vrouwe et al.

(10) Patent No.: US 10,493,454 B2
(45) Date of Patent: Dec. 3, 2019

(54) DEVICE AND METHOD FOR ACTIVATING A CAPILLARY-STOP VALVE OF A DEVICE

(71) Applicant: Micronit Microtechnologies B.V., Enschede (NL)

(72) Inventors: Elwin Xander Vrouwe, Enschede (NL); Manjeet Dhindsa, Enschede (NL); Marinus Bernardus Olde Riekerink, Losser (NL); Ronny Van't Oever, Epse (NL); Marko Theodoor Blom, Delden (NL)

(73) Assignee: Micronit Microtechnologies B.V., Enschede (NL)

( * ) Notice: Subject to any disclaimer, the term of this patent is extended or adjusted under 35 U.S.C. 154(b) by 732 days.

(21) Appl. No.: 14/431,161

(22) PCT Filed: Sep. 25, 2013

(86) PCT No.: PCT/NL2013/050687
§ 371 (c)(1),
(2) Date: Mar. 25, 2015

(87) PCT Pub. No.: WO2014/051427
PCT Pub. Date: Apr. 3, 2014

(65) Prior Publication Data
US 2015/0238961 A1    Aug. 27, 2015

(30) Foreign Application Priority Data

Sep. 25, 2012    (NL) ...................................... 2009517

(51) Int. Cl.
*G01N 27/26*    (2006.01)
*B01L 3/00*    (2006.01)
*F16K 99/00*    (2006.01)

(52) U.S. Cl.
CPC .... B01L 3/502738 (2013.01); F16K 99/0017 (2013.01)

(58) Field of Classification Search
CPC ......... B01L 3/502738; B01L 2200/143; B01L 2300/0645; B01L 2300/069;
(Continued)

(56) References Cited

U.S. PATENT DOCUMENTS 4,752,788 A    6/1988 Yasuhara et al.
4,819,014 A    4/1989 Yasuhara et al.
(Continued)

FOREIGN PATENT DOCUMENTS

DE    3630206 A1    3/1987
WO    2012098140 A1    7/2012

OTHER PUBLICATIONS

International Search Report and Written Opinion dated Nov. 29, 2013 (PCT/NL2013/050687); ISA/EP.

*Primary Examiner* — Thanh Truc Trinh
(74) *Attorney, Agent, or Firm* — Banner & Witcoff, Ltd.

(57) ABSTRACT

The invention relates to a device (20), comprising:
a liquid container (21) for containing a liquid;
a capillary-stop valve (22) that is in medium through flow connection with said liquid container (21) for stopping said liquid in said container from flowing out of said container via said capillary-stop valve (22);
a first electrode (7) being arranged such that in use said first electrode is in contact with said liquid in said liquid container;
a second electrode (2) that is spaced apart from said capillary-stop valve by an electrically insulating medium gap (24), and
a voltage source (V) connected to said first and second electrode which is activatable for applying an electric potential difference at the first and second electrode
(Continued)

such that the liquid in the liquid container is attracted in the direction of said second electrode so as to allow the liquid to overcome the stopping effect of the capillary-stop valve for discharging liquid from said liquid container via said capillary-stop valve. The invention also relates to a method for activating a capillary-stop valve of a device.

13 Claims, 7 Drawing Sheets

(58) Field of Classification Search
CPC ..... B01L 2300/0829; B01L 2300/0874; B01L 2300/0887; B01L 2300/089; B01L 2300/12; B01L 2300/161; B01L 2400/0415; B01L 2400/0688; F16K 99/0017; F16K 2099/0084; F16K 99/0042
See application file for complete search history.

(56) References Cited

U.S. PATENT DOCUMENTS

| | | | |
|---|---|---|---|
| 6,007,690 A * | 12/1999 | Nelson | G01N 27/44791 204/450 |
| 6,444,106 B1 | 9/2002 | McBride et al. | |
| 6,444,173 B1 | 9/2002 | Sjursen et al. | |
| 2003/0049177 A1 | 3/2003 | Smith et al. | |

* cited by examiner

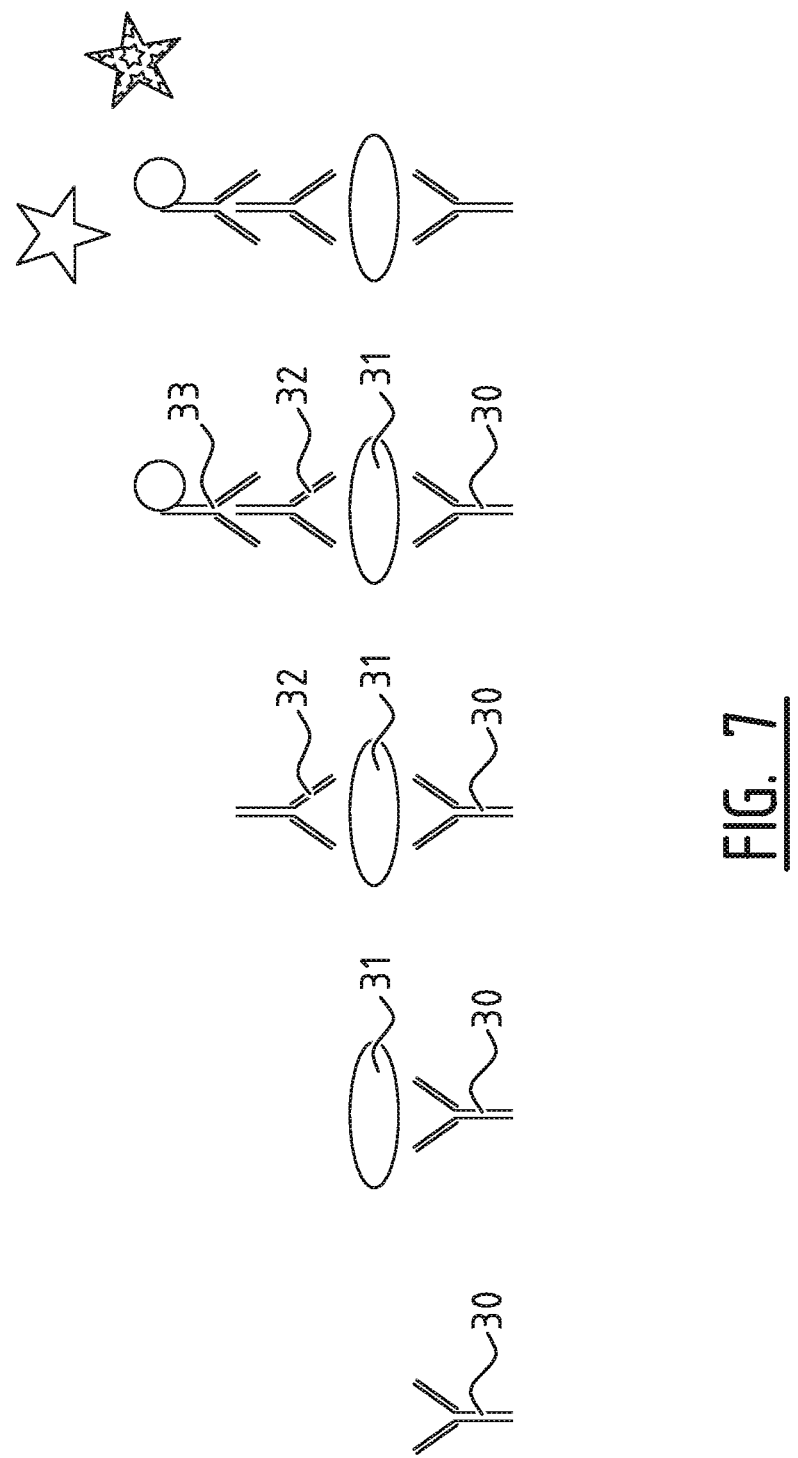

DEVICE AND METHOD FOR ACTIVATING A CAPILLARY-STOP VALVE OF A DEVICE

This application is a U.S. National Phase Entry of International Application No. PCT/NL2013/050687 filed on Sep. 25, 2013, designating the United States of America and claiming priority to NL Patent Application No. 2009517 filed on Sep. 25, 2012. The present application claims priority to and the benefit of the above-identified applications, and the above-identified applications are incorporated by reference herein in their entirety.

The invention relates to a device, comprising:
- a liquid container for containing a liquid, and
- a capillary-stop valve that is in medium through flow connection with said liquid container for stopping said liquid in said container from flowing out of said container via said capillary-stop valve.

Such a device is known perse and is a micro fluidic device in which the flow of the liquid contained in the container can be controlled by said capillary-stop valve. It is noted that in this respect the capillary-stop valve refers to both a capillary valve and a hydrophobic valve, which are both well-established valve types that have no moving parts and are easily implemented in the production of a micro-fluidic devices. Such capillary-stop valves function by introducing an abrupt increase in the effective contact angle between the liquid and the inner surface of the capillary-stop valve, e.g. by means of change of geometry of the capillary valve or a change of the wettability of the inner surface of the hydrophobic valve. A capillary-stop valve may for example comprise a sudden increase of diameter with a close to 90 degrees transition from a small to larger diameter or it may comprise a substantially hydrophobic section or a combination of the two.

It is an object of the invention to improve the device according to the preamble. In particular it is an object of the invention to provide a device of the type described in the preamble with a capillary-stop valve that can be activated by a user at any time, such that said liquid will flow out of said liquid reservoir via said capillary-stop valve upon activation.

This objective is achieved by a device of the type according to the preamble, that is characterized by:
- a first electrode being arranged such that in use said first electrode is in contact with said liquid in said liquid container;
- a second electrode that is spaced apart from said capillary-stop valve by an electrically insulating medium gap, and
- a voltage source connected to said first and second electrode which is activatable for applying an electric potential difference at the first and second electrode such that the liquid in the liquid container is attracted in the direction of said second electrode so as to allow the liquid to overcome the stopping effect of the capillary-stop valve for discharging liquid from said liquid container via said capillary-stop valve.

By attracting the liquid in the direction of said second electrode as a result of the electrostatic force the liquid is drawn out of the liquid container due to any of the following two effects or a combination thereof.

The first effect is that by attracting the liquid in the direction of the second electrode the contact angle of the liquid with respect to an opening of the capillary-stop valve is increased. After reaching a predetermined minimum contact angle the liquid will overcome the stopping effect provided by the capillary-stop valve and will flow out the fluid container. Said predetermined minimum contact angle is dependent on the material of the substrate and/or the type of liquid.

The second effect is that by attracting the liquid in the direction of the second electrode the liquid will come into contact with the second electrode or with a wall of a second fluid container, wherein after making contact with the second electrode or said wall the liquid will be discharged from said liquid container.

The second electrode is arranged such that in most cases a gas gap, in particular an air gap, is present between the second electrode and the liquid. In particular, the second electrode is arranged such that the second electrode does not overlap with the edge of the liquid meniscus, see also the figures. It is noted that instead of a gas said electrically insulating medium may be any immiscible fluidic medium, for example oil The mutually cooperating first electrode and second electrode also offer the advantage, that they may be used for detecting whether the capillary-stop valve has been activated or triggered, either intentionally or unintentionally, by measuring the electrical current as a function of the applied voltage or AC frequency. In the un-triggered state a DC current cannot flow whereas when the valve has been triggered and the liquid is electrically conductive a DC current can flow. Alternatively, when using an AC voltage the electrical impedance of the system is affected whether the valve has been triggered or not. The advantage of an AC voltage is that an electrochemical reaction at the electrodes is not needed in order to measure a current, and therefore there is no risk of changing the chemical composition of the liquid.

The triggering of the capillary-stop valve according the invention can advantageously be applied to micro fluidic devices already comprising a voltage source for a different purpose.

Said liquid container is for example, but not limited thereto, a channel, in particularly a capillary channel, a reservoir, or a well of a microtiterplate volume.

In an embodiment of the device according to the invention said device comprises a second liquid container for receiving liquid that is discharged from said liquid container via said capillary-stop valve.

Said second liquid container is for example, but not limited thereto, a channel, in particularly a capillary channel, a reservoir, or an absorber.

In particular an absorber, such as a blotting pad or the like, has the advantage that such an absorber will suck up the liquid that is discharged from said liquid container via said capillary-stop valve. As a result of said suction force all the liquid discharged from said liquid container is drawn to the absorber, such that no liquid will remain in the first liquid container or in a flow path between the first and second liquid containers.

It is noted that in particular when an absorber is used, it is not necessary to provide a gas to clear the flow path between the first and second liquid containers.

Said reservoir may for example be a reaction zone, in which reaction zone chemical reactions between (bio) chemical species in said liquid and other species, for example antibodies contained in said reaction zone, may take place, for example for detecting or sensing analytes in the liquid or sample.

A plurality of second liquid containers may be provided. For example, said stop valve may be provided between said first liquid container and a (capillary) channel, wherein said (capillary) channel may connect to said reaction zone and/or said absorber.

In another embodiment of the device according to the invention, the capillary-stop valve and the second liquid container are arranged such that the flow direction of the liquid in the capillary-stop valve is substantially orthogonal to the flow direction of the liquid in the second liquid container.

In even another embodiment of the device according to the invention, the device comprises a first substrate comprising said liquid container and a second substrate comprising said second liquid container.

Such a device has the advantage that the freedom of manufacturing is increased. For example, said first substrate and said second substrate may be made independent from each other, if preferred in different locations, and then assembled. Also, this allows said first substrate and said second substrate to be made from different materials.

In yet even another embodiment of the device according to the invention, the second substrate is made of an electrically conductive material for forming said second electrode.

Alternatively, said second substrate is made of an electrically insulating material comprising a patterned or unpatterned electrically conductive layer for forming said second electrode.

Said electrically conductive layer may for example be applied on a side of the insulating material that is facing towards said first electrode.

Alternatively, said electrically conductive layer is arranged on a side of the insulating material that is facing away from said first electrode.

Such an arrangement offers the advantage that the liquid will not come into direct contact with the second electrode after discharging from the liquid container.

Said device or said first substrate is for example, but not limited thereto, made of glass, silicon, ceramic or polymer.

In yet even another embodiment of the device according to the invention, said device comprises:
- a plurality of liquid containers, each for containing a liquid;
- a plurality of capillary-stop valves, each being in medium through flow connection with a respective liquid container for stopping said liquid in said container from flowing out of said container via said capillary-stop valve;
- a plurality of first electrodes being arranged such that in use each said first electrode is in contact with said liquid in a respective liquid container, and
- a plurality of second electrodes, each being spaced apart from a respective capillary-stop valve by an electrically insulating medium gap, wherein said voltage source or a plurality of voltage sources is connected to each pair of first and second electrodes which is activatable such that an electric potential difference can be applied at each pair of first and second electrodes.

In yet even another embodiment of the device according to the invention, said device comprises:
- a plurality of first liquid containers, each for containing a liquid,
- at least one second liquid container for receiving said first liquid(s);
- a plurality of capillary-stop valves, each being in medium through flow connection with a respective liquid container for stopping said liquid in said container from flowing out of said container via said capillary-stop valve;
- a plurality of first electrodes being arranged such that in use each said first electrode is in contact with said liquid in a respective liquid container, and
- a plurality of second electrodes, each being spaced apart from a respective capillary-stop valve by an electrically insulating medium gap, wherein said voltage source or a plurality of voltage sources is connected to each pair of first and second electrodes which is activatable such that an electric potential difference can be applied at each pair of first and second electrodes, and wherein at least two of said plurality of first liquid containers are in medium through flow connection with said at least one second liquid container.

Such a plurality of (first) liquid containers, each comprising a capillary-stop valve and mutually cooperating first and second electrodes offer the advantage, that the discharge of liquid from each liquid container may be controlled by a user. The activation or triggering of each capillary-stop valve may take place at substantially the same time, or may take place sequentially, or any combination thereof, which allows for good controlling of the liquid flow in the device. The activation or triggering of the plurality of capillary-stop valves may optionally be programmed in a computer program, which computer program may be included in the device.

In the embodiment of the device wherein at least two of said plurality of first liquid containers are in medium through flow connection with said at least one second liquid container it is possible to have different liquids flow in, to or through the same second liquid container, such as a (capillary) channel, a reservoir, for example a reaction zone, or an absorber. Such an embodiment is for example suitable for use as a biochemistry assay, in which a sample may flow through a reaction zone after triggering the stop valve of the liquid container in which said sample is contained, and wherein next a washing liquid may flow through said same reaction zone after triggering the stop valve of the liquid container in which said washing liquid is contained. This washing step can for instance be applied to remove any non-reacted or non-bound species.

Said first liquid containers may connect to said second liquid container via separate channels or other separate connection means. Alternatively, said first liquid containers may be in medium through flow connection with each other, wherein for example a channel or other connection means connect at least two first liquid containers, and wherein one of the first liquid containers connects to said second liquid container. In such an arrangement the other first liquid containers connect to said second liquid container via said one first liquid container. In yet even another embodiment of the device according to the invention, said device comprises:
- a second capillary-stop valve that is in medium through flow connection with said second liquid container for stopping said liquid in said second liquid container from flowing out of said second liquid container via said second capillary-stop valve;
- a second first electrode being arranged such that in use said second first electrode is in contact with said liquid in a said second liquid container, and
- a second second electrode that is spaced apart from said second capillary-stop valve by an electrically insulating medium gap, wherein said voltage source or a plurality of voltage sources is connected to said pair of second first and second electrodes which is activatable such that an electric potential difference can be applied at said pair of second first and second electrodes.

Such a second capillary-stop valve that may be triggered independently from the first capillary-stop valve has the advantage that the residence time of the liquid in the second reservoir is adjustable by adjusting the time period between triggering the first capillary-stop valve and the second capillary-stop valve. This is for example advantageous if the second liquid container comprises a reaction zone. Said second liquid container may be in medium through flow connection with a further second liquid container, which may also be referred to as a third liquid container, for receiving the liquid from the second liquid container. The further second liquid container or third liquid container may for example comprise an absorber.

For triggering the plurality of capillary-stop valves, in particular for example the first and second capillary-stop valves, sequentially, the electric potential difference can be applied to one pair of first and second electrodes or pair of second first and second electrodes independently of the other pair(s).

For example, a plurality of switches may be provided, each switch breaking an electrical circuit of the respective pair of first and second electrodes or pair of second first and second electrodes, wherein the capillary-stop valve may be activated or triggered by operating said switch for completing the respective electrical circuit.

One electrode of a pair of first and second electrodes or a pair of second first and second electrodes may be integrally formed with another electrode of another pair of first and second electrodes or another pair of second first and second electrodes.

For example, all or part of said plurality of first electrodes may be integrally formed while all or part of said plurality of second electrodes of those pairs are not integrally formed and are therefore individually controllable, such that a potential difference can be applied at each pair of first and second electrodes individually, even when the first electrodes are formed as one integral electrode. Alternatively, all or part of said plurality of second electrodes may be integrally formed while all or part of said plurality of first electrodes of those pairs are not integrally formed and are therefore individually controllable. Thus, a plurality of electrodes does not necessarily have to be a plurality of separate electrodes but may be formed as one integral electrode. A plurality of electrodes is in that case to be understood as an integrally formed electrode fulfilling the functions of a plurality of electrodes.

For example, the second electrode may be integrally formed with the second first electrode while the first electrode and the second second electrode are not integrally formed and are therefore individually controllable. Such a configuration is possible if, when the liquid is stopped at the second stop valve, the liquid is still in contact with the second electrode at the first stop valve, such that the second electrode of the first stop valve may function as the second first electrode of the second stop valve.

For example, the second first electrode may be integrally formed with the first electrode(s) while the second second electrode is not integrally formed with the second electrode(s) and are therefore individually controllable. Alternatively the second second electrode may be integrally formed with the second electrode(s) while the second first electrode is not integrally formed with the first electrode(s) and are therefore individually controllable.

The invention is not limited to the above described examples of integrally formed electrodes. It will be clear for the skilled person which electrodes may be formed integrally or not.

The integrally formed electrodes may for example be formed by an electrically conductive substrate or an electrically conductive layer provided on said substrate.

The invention also relates to a method for activating a capillary-stop valve of a device, said method comprising the step of:

(a) applying an electric potential difference at two mutually cooperating electrodes, wherein a first electrode is in contact with a liquid that is stopped by said capillary-stop valve, and wherein the second electrode is spaced apart from said capillary-stop valve, such that the liquid is attracted in the direction of said second electrode so as to allow the liquid to overcome the stopping effect of the capillary-stop valve.

As described above, said attraction occurs as a result of the electrostatic force, as a result of which the liquid will overcome the stopping effect of the capillary-stop valve.

In an embodiment of the method according to the invention, said method comprises the step, to be performed before step (a), of:

(b) providing a device according to the invention as described above, said device comprising:
  a liquid container for containing a liquid;
  a capillary-stop valve that is in medium through flow connection with said liquid container for stopping said liquid in said container from flowing out of said container via said capillary-stop valve;
  a first electrode being arranged such that in use said first electrode is in contact with said liquid in said liquid container;
  a second electrode that is spaced apart from said capillary-stop valve by an electrically insulating medium gap, and
  a voltage source connected to said first and second electrode which is activatable for applying an electric potential difference at the first and second electrode such that the liquid in the liquid reservoir is attracted in the direction of said second electrode so as to allow the liquid to overcome the stopping effect of the capillary-stop valve for discharging liquid from said liquid container via said capillary-stop valve,
wherein step (a) is performed by applying the electric potential difference at the first and second electrodes.

In another embodiment of the method according to the invention said device further comprises:
  a plurality of liquid containers, each for containing a liquid;
  a plurality of capillary-stop valves, each being in medium through flow connection with a respective liquid container for stopping said liquid in said container from flowing out of said container via said capillary-stop valve;
  a plurality of first electrodes being arranged such that in use each said first electrode is in contact with said liquid in a respective liquid container, and
  a plurality of second electrodes, each being spaced apart from a respective capillary-stop valve by an electrically insulating medium gap,
wherein said voltage source or a plurality of voltage sources is connected to each pair of first and second electrodes which is activatable such that an electric potential difference can be applied at each pair of first and second electrodes, and wherein the electric potential difference can be applied to one pair of first and second electrodes independently of the other pair(s), said method comprising the step of:

(c) repeating step (a) for each pair of first and second electrodes independent of the other pair(s).

In another embodiment of the method according to the invention said device further comprises:

a plurality of first liquid containers, each for containing a liquid;

at least one second liquid container for receiving said first liquid(s);

a plurality of capillary-stop valves, each being in medium through flow connection with a respective liquid container for stopping said liquid in said container from flowing out of said container via said capillary-stop valve;

a plurality of first electrodes being arranged such that in use each said first electrode is in contact with said liquid in a respective liquid container, and a plurality of second electrodes, each being spaced apart from a respective capillary-stop valve by an electrically insulating medium gap, wherein said voltage source or a plurality of voltage sources is connected to each pair of first and second electrodes which is activatable such that an electric potential difference can be applied at each pair of first and second electrodes, wherein the electric potential difference can be applied to one pair of first and second electrodes independently of the other pair(s);

and wherein at least two of said plurality of first liquid containers are in medium through flow connection with said at least one second liquid container, said method comprising the step of:

(c) repeating step (a) for each pair of first and second electrodes independent of the other pair(s).

In yet another embodiment of the method according to the invention said substrate further comprises:

a second capillary-stop valve that is in medium through flow connection with said second liquid container for stopping said liquid in said second liquid container from flowing out of said second liquid container via said second capillary-stop valve;

a second first electrode being arranged such that in use said second first electrode is in contact with said liquid in a said second liquid container, and a second second electrode that is spaced apart from said second capillary-stop valve by an electrically insulating medium gap, wherein said voltage source or a plurality of voltage sources is connected to said pair of second first and second electrodes which is activatable such that an electric potential difference can be applied at said pair of second first and second electrodes, said method comprising the step of:

(c) repeating step (a) for each pair of second first and second electrodes independent of the other pair(s).

As described above, such methods allow for controlling the triggering of the plurality of capillary-stop valves, either simultaneously, sequentially, or any combination thereof. In addition, such methods allow for, for example, a biochemistry assay to be performed.

The invention will now be explained in more detail with reference to figures illustrated in a drawing, wherein:

FIG. 7 shows the steps of a type of biochemistry assay for which the device according to the invention may be used. Same elements are denoted by the same reference numerals.

Figure 1A:
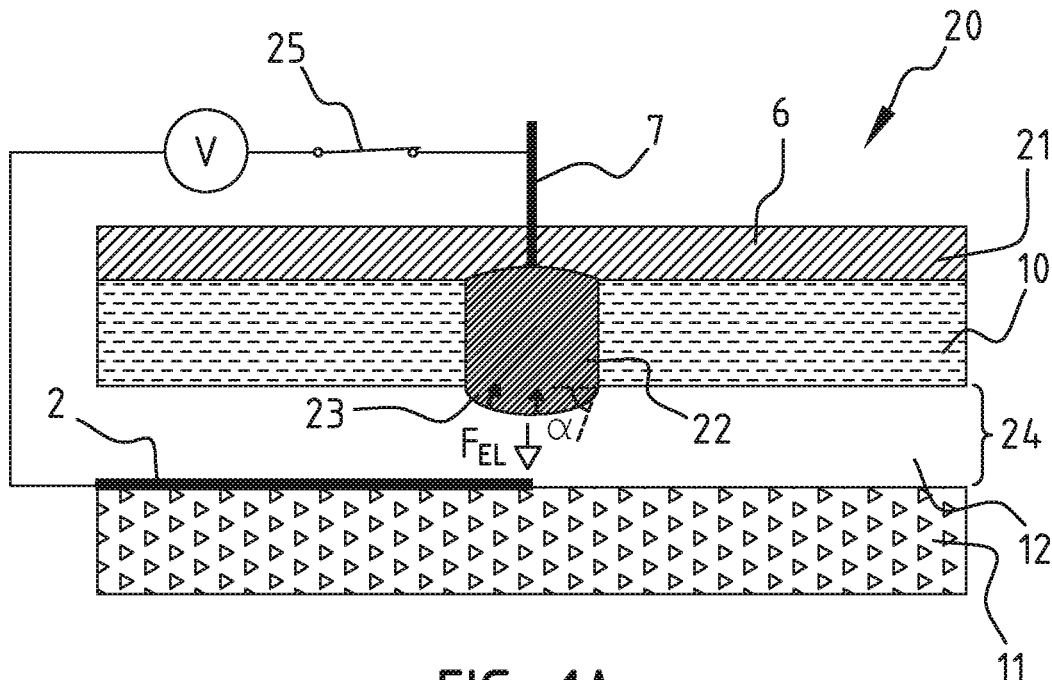
FIGS. 1a, 1b are a schematic cross section of a first and second embodiment of the device according to the invention.

FIG. 1a shows a device 20, comprising a liquid container 21 for containing a liquid 6 and a capillary-stop valve 22 that is in medium through flow connection with said liquid container 21 for stopping said liquid 6 in said container 21 from flowing out of said container 21 via said capillary-stop valve 22. A first electrode 7 is arranged in the liquid container 21. It is noted that the first electrode 7 may be located anywhere, as long as it contacts said liquid 6 in said liquid container 21. The liquid container 21 of the first embodiment of the device 20 is formed by the upper side of the device 20, on which the liquid 6 is applied. The capillary-stop valve 22 is formed by an opening in the device 20, said opening extending from the upper side of the device 20 to a second liquid container 12, wherein said opening has a sudden increase of diameter with a close to 90 degrees transition from a small to larger diameter, such that said opening functions as the capillary-stop valve 22. A second or counter electrode 2 arranged on a side of the second liquid container 12 facing said capillary-stop valve 22 and is spaced apart from said capillary-stop valve 22 by an electrically insulating medium gap 24. A voltage source (V) is connected to said first electrode 7 and said second electrode 2, which voltage source (V) is activatable by means of a switch 25 for applying an electric potential difference at the first and second electrode such that the liquid 6 in the liquid container 21 is attracted in the direction of said second electrode 2 so as to allow the liquid 6 to overcome the stopping effect of the capillary-stop valve 22 for discharging liquid 6 from said liquid container 21 via said capillary-stop valve 22. Said liquid 6 is attracted in the direction of said second electrode 2 as a result of the electrostatic force, indicated by $F_{EL}$. A contact angle α between the liquid and the opening of the capillary-stop valve 22 is thereby increased. Once the contact angle α reaches a predetermined minimum contact angle the liquid 6 will overcome the stopping effect provided by the capillary-stop valve 22 and will flow out the fluid container 21. Additionally, or alternatively, said liquid may come into contact with a wall of the second liquid container 12 or with the second electrode 2. At this point the capillary force is present again resulting in a continuation of flow of the liquid 6 into the second container 12 without the necessity of applying any further external force. Said capillary-stop valve 22 is arranged in an upper part 10 of the device 20, and the second liquid container 12 is arranged in a lower part 11 of the device 20. Said upper part 10 and said lower part 11 may be formed as one integral substrate, or may be formed as two separated substrates, which are connected to each other. Said second liquid container 12 is in this embodiment a capillary channel formed in the lower part 11 or a capillary split formed between the upper part 10 and the lower part 11. Due to the capillary effect said liquid 6 is transported in the second container 12 after triggering the capillary-stop valve 22. As such FIG. 1a shows the principle of electrostatically triggering a fluid 6 stopped in a capillary-stop valve 22 and a counter electrode 2 opposite of the liquid 6.

It is noted that the meniscus 23 of the liquid 6 is shown in an attracted state, just before the liquid 6 overcomes the stopping effect of the capillary-stop valve 22. Before closing the switch 25 said meniscus has a more or less flat shape.

It is further noted that it is clear from FIG. 1a that the capillary-stop valve 22 and the second liquid container 12 are arranged such that the flow direction of the liquid 6 in the capillary-stop valve 22 is substantially orthogonal to the flow direction of the liquid 6 in the second liquid container 12.

Figure 1B:
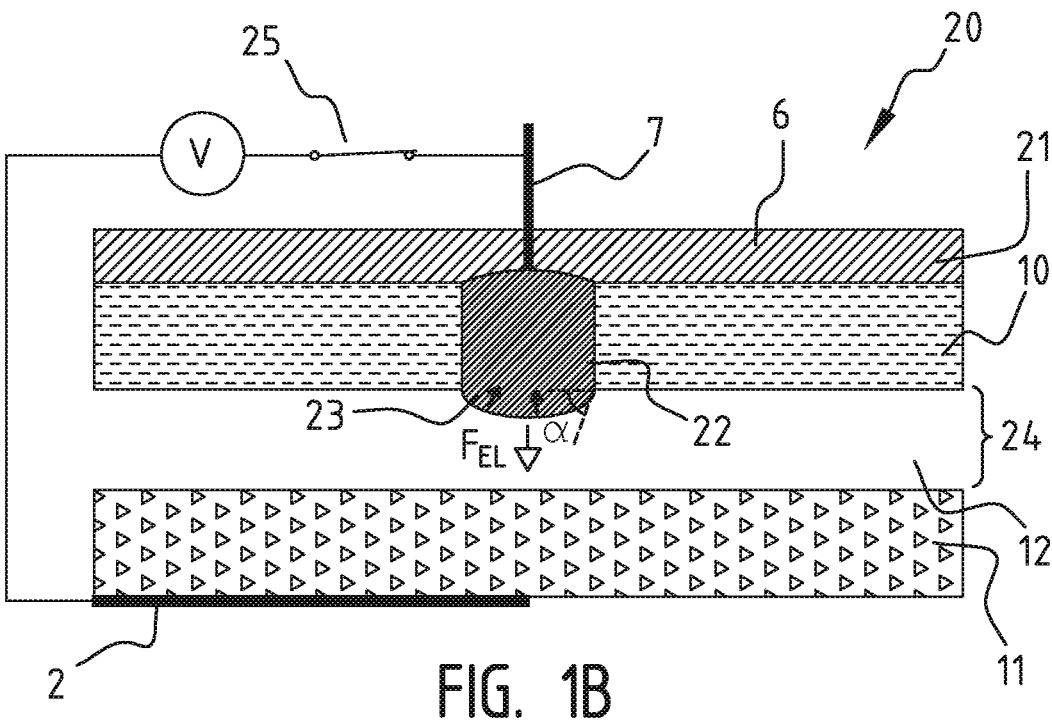

The embodiment of FIG. 1b differs from the embodiment of FIG. 1a in that the second electrode 2 is arranged on a side of lower part 11 that is facing away from said first electrode 7. In this embodiment said lower part 11 is a dielectric substrate. As such FIG. 1b shows the principle of electrostatically triggering a fluid 6 stopped in a capillary-stop valve 22 and a counter electrode 2 at the bottom of a dielectric substrate 11.

Figure 2:
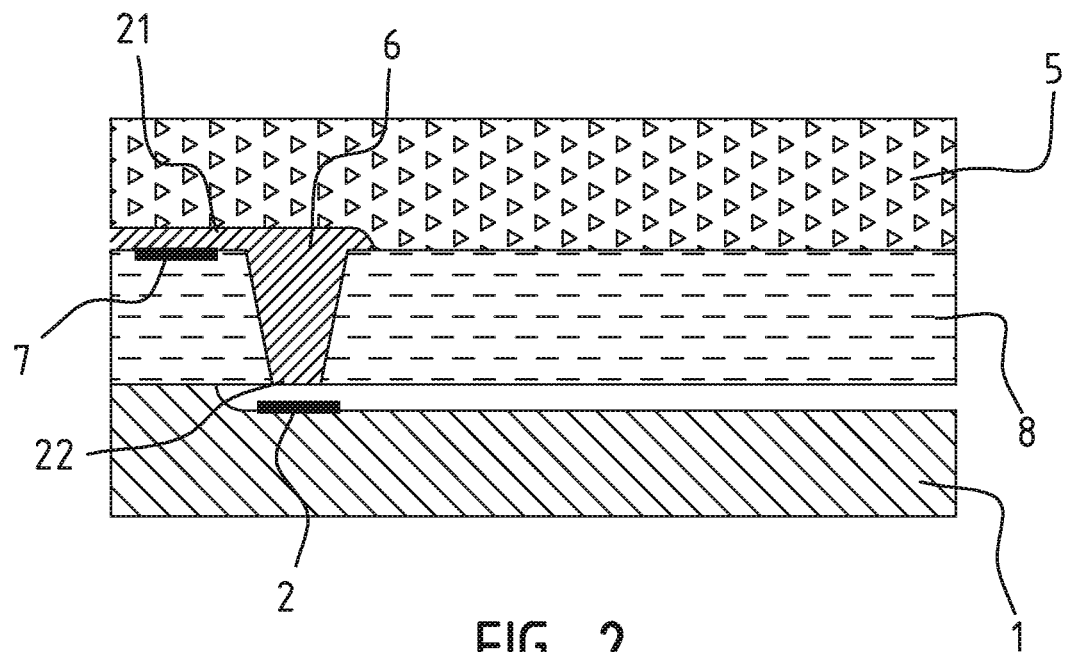
FIG. 2 is a schematic cross section of a third embodiment of the device according to the invention.

FIG. 2 schematically shows a cross section of a possible implementation of an electrostatically triggered valve 22 in a fluidic device 20. Here, fluid 6 enters a channel 21, formed between an upper substrate 5 and a middle substrate 8, by capillary force and reaches an abrupt change in the cross section of the fluidic channel 21 at the interface between middle substrate 8 and bottom substrate 1, at which point the capillary flow will stop. Thus the capillary-stop valve 22 is formed by the channel 21. By applying a potential difference between electrode 7 and counter electrode 2 the fluid 6 will be attracted to the counter electrode 2. When the fluid 6 contacts the counter electrode it experiences a capillary force in the fluidic channel 12 resulting in a continuation of capillary flow also when the potential difference between the electrodes is removed.

Figure 3:
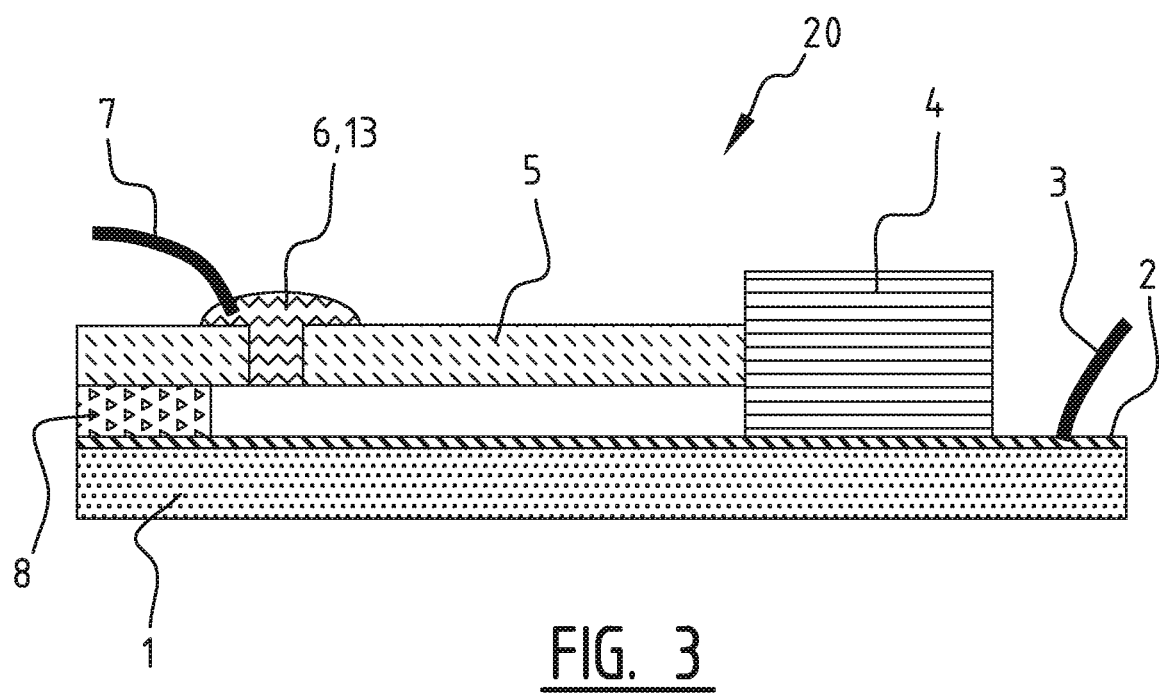
FIG. 3 is a schematic cross section of a fourth embodiment of the device according to the invention.
Figure 4A:
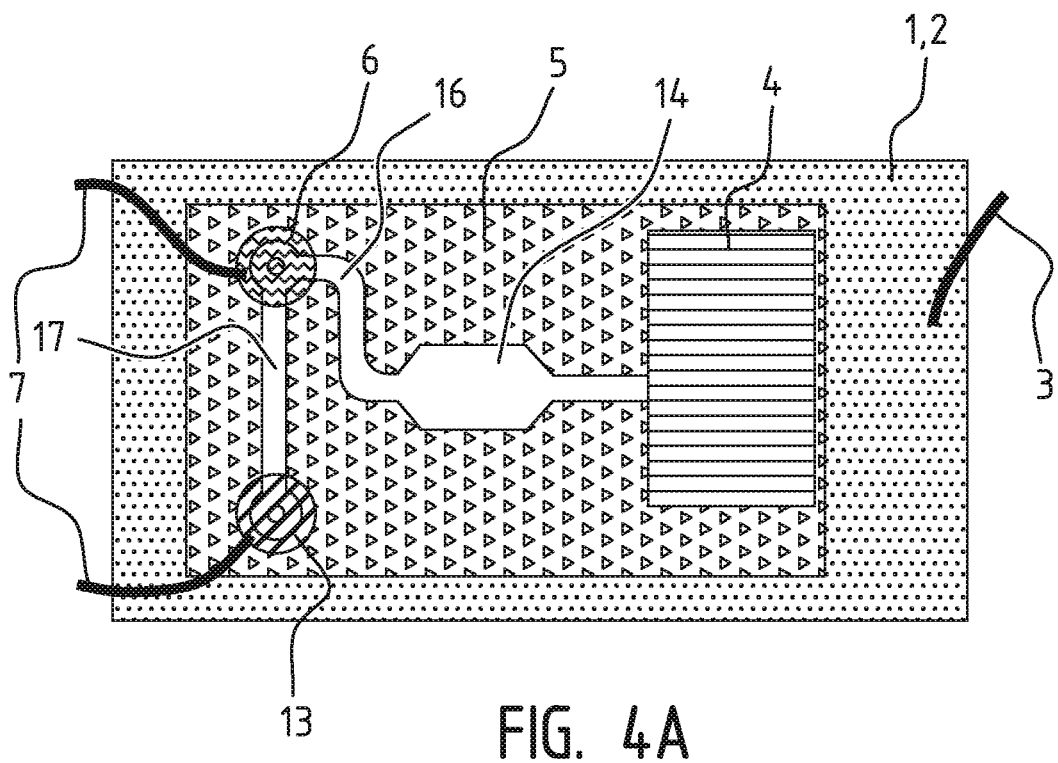
FIGS. 4a-4d show the steps of activating the fluid flow of the device of FIG. 3.
Figure 4B:
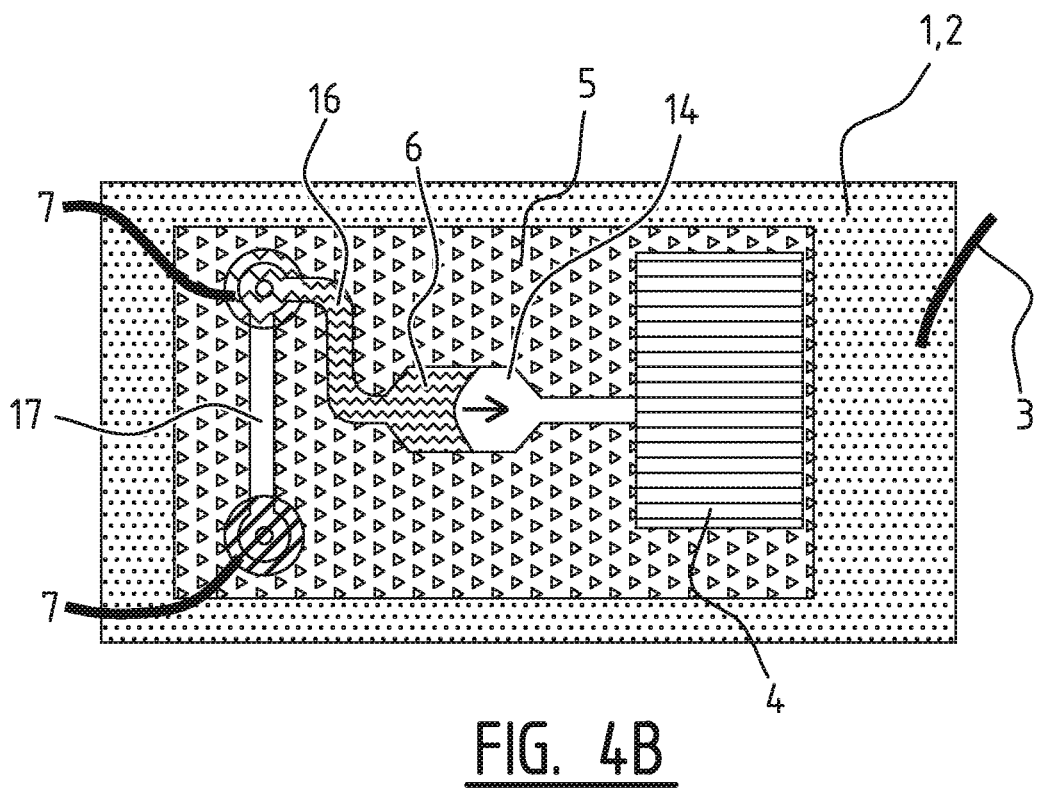
Figure 4C:
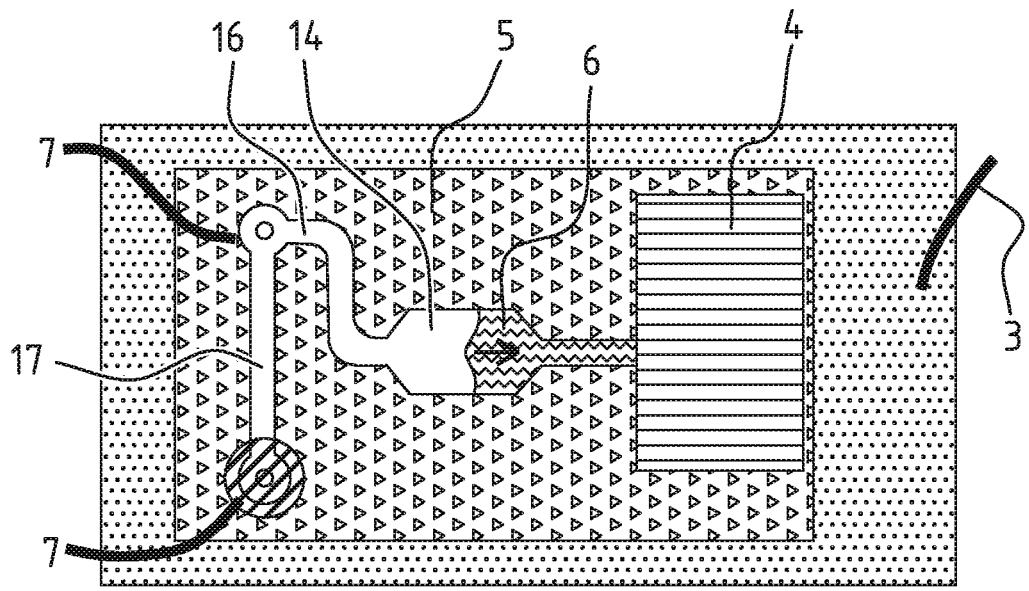
Figure 4D:
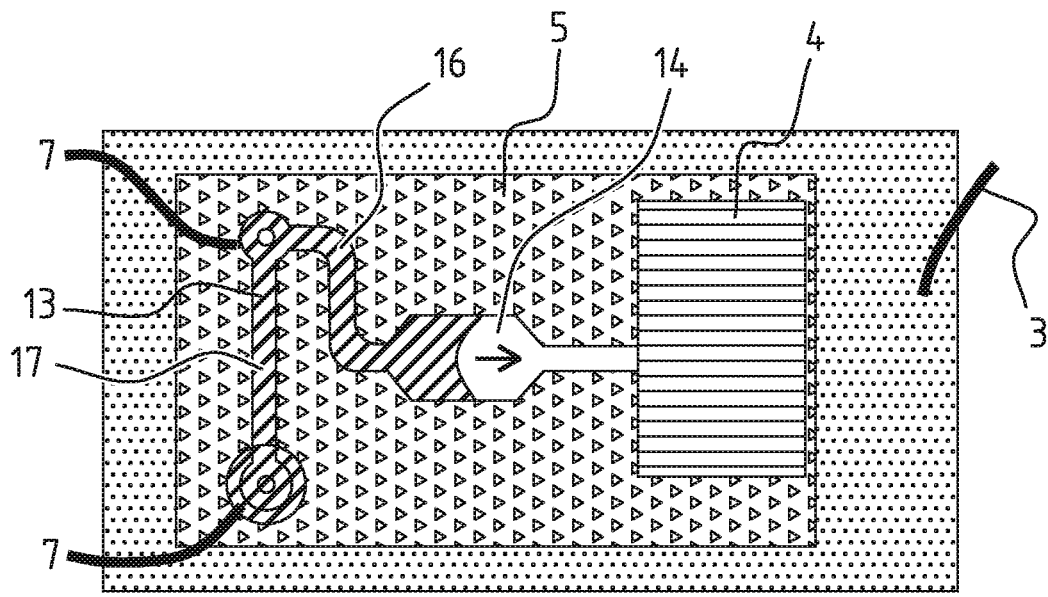

FIG. 3 shows a cross-section of a device 20 that can be used to create a flow of two liquids 6,13, which are contained in two liquid containers, each provided with a capillary-stop valve that can be triggered independently by means of mutually cooperating electrodes 2, 7. The second electrode 2 is formed over substantially the entire upper surface of bottom substrate 1 and is connected to the voltage source (not shown) by a connector 3. The second electrodes 2 are hereby formed as one integrally formed electrode. The first electrodes 7 are individually controllable. Instead of one integrally formed second electrode 2, the first electrodes 7 may be formed as one integrally formed electrode in which case the second electrodes 2 are formed as individual controllable electrodes.

FIGS. 4a-4d show a top down view of the sequence that is generated with the embodiment of the device of FIG. 3. Liquid 6 is first triggered, FIG. 4a, flows through the fluidic structure, FIG. 4b, and is absorbed by a blotting pad 4, FIG. 4c. Next, the second liquid 13 is triggered, which flows through the fluidic structure, FIG. 4d, and is absorbed by the blotting pad 4. The fluid flow of the liquids 6, 13 is indicated by the arrows. A sequence like this could for example be used to first flow a sample through a device and subsequently wash the device with the second liquid. The liquids 6, 13 both flow through a reaction zone 14. The reaction zone 14 is a zone wherein (bio)chemical species contained in the sample, for example the first liquid 6, may undergo a chemical reaction, for example for detecting or sensing said particular particles. If the second liquid 13 is a washing liquid it may wash the reaction zone 14, such that unreacted or unbound species are removed from the detection site. The liquid container containing the first liquid 6 is connected to reaction zone 14 via a channel 16. The liquid container containing second liquid 13 is connected to reaction zone 14 via a channel 17 and said channel 16, wherein channel 17 is in medium through flow connection with channel 16.

It is noted that instead of one or two liquid containers, each with a capillary-stop valve and mutually cooperating electrodes for triggering the capillary-stop valves, any number of liquid containers with a capillary-stop valve and mutually cooperating electrodes for triggering the capillary-stop valves may be used.

Figure 5:
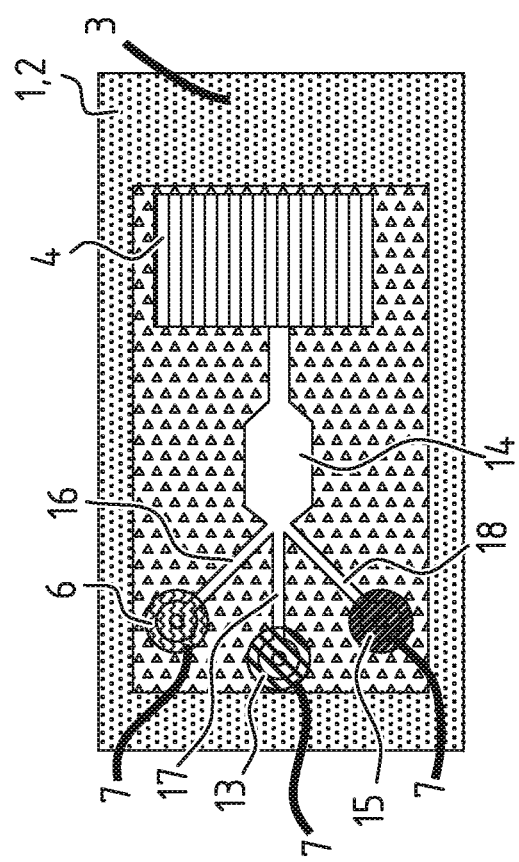
FIG. 5 is a schematic top view of a fifth embodiment of the device according to the invention.

For example in FIG. 5 a device is shown that comprises three liquid containers each containing a respective liquid 6, 13, 15. The liquid container containing first liquid 6 is connected to reaction zone 14 via a channel 16. The liquid container containing second liquid 13 is connected to reaction zone 14 via a channel 17. The liquid container containing third liquid 15 is connected to reaction zone 14 via a channel 18. In this embodiment, all liquids 6, 13, 15 will flow successively through reaction zone 14 after triggering of the respective stop valve thereof, which stop valves can be triggered independently by means of mutually cooperating electrodes 2, 7. The second electrode 2 is formed over substantially the entire upper surface of bottom substrate 1 and is connected to the voltage source (not shown) by a connector 3. As for the embodiment of FIGS. 3 and 4a-4d, a sequence like this could for example be used to first flow a sample through a device and subsequently wash the device with the second liquid, and then flow a third liquid through the device. The reaction zone 14 is a zone wherein first (bio)chemical species contained in the sample, for example the first liquid 6, may undergo a chemical reaction, for example for detecting or sensing said first species. If the second liquid 13 is a washing liquid it will then wash the reaction zone 14. After washing with said second liquid 13, a third liquid 15 may be triggered to flow through reaction zone 14, wherein particular second species contained in the third liquid may undergo a second chemical reaction, for example for aiding in detecting or sensing said first species. The difference between the embodiment of FIGS. 3 and 4a-4d and the embodiment of FIG. 5 is that the channels 16, 17 (and 18) in the embodiment of FIG. 5 are each connected separately from the other channels to reaction zone 14. As such, only one liquid of the three liquids 6, 13 and 15 will flow through one respective channel 16, 17 and 18, but all three liquids 6, 13 and 15 will flow through reaction zone 14.

Figure 6A:
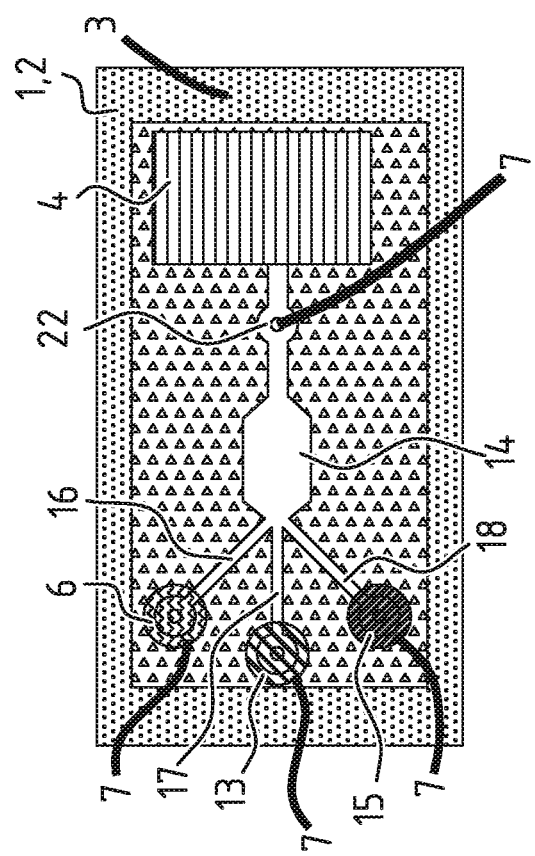
FIGS. 6a-6d show the steps of activating the fluid flow of sixth embodiment of the device according to the invention.
Figure 6B:
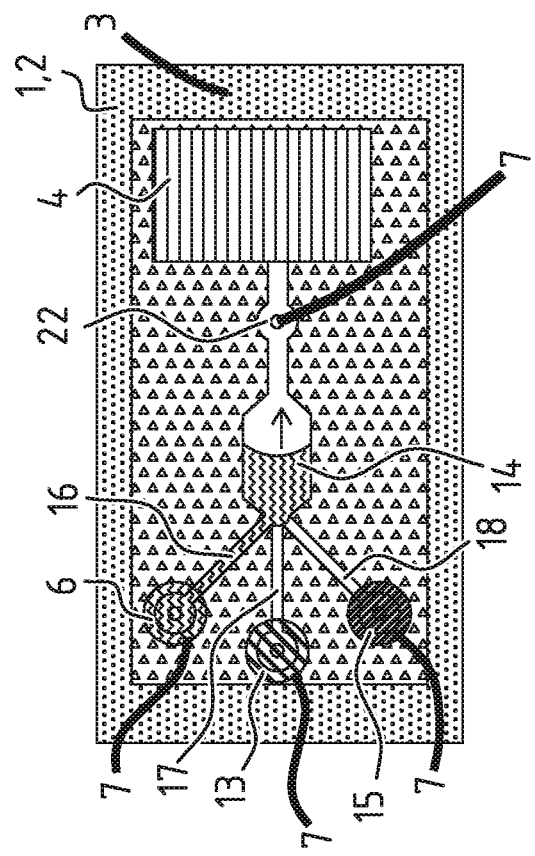
Figure 6C:
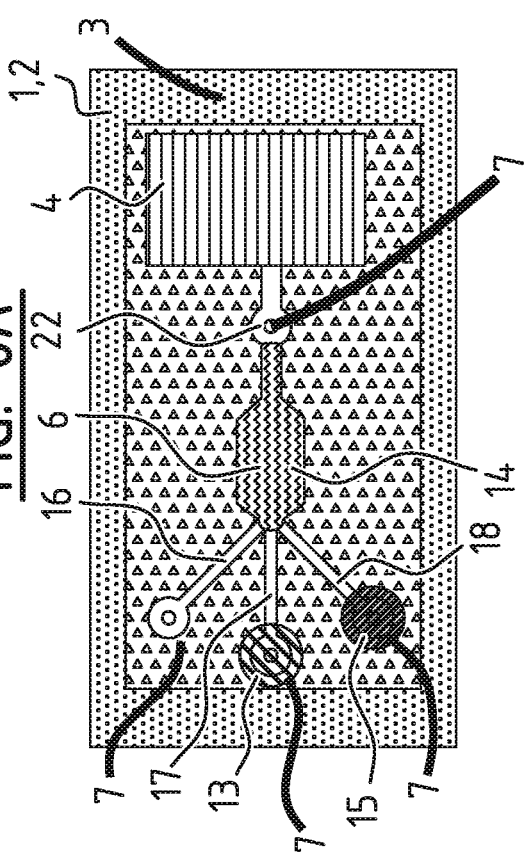
Figure 6D:
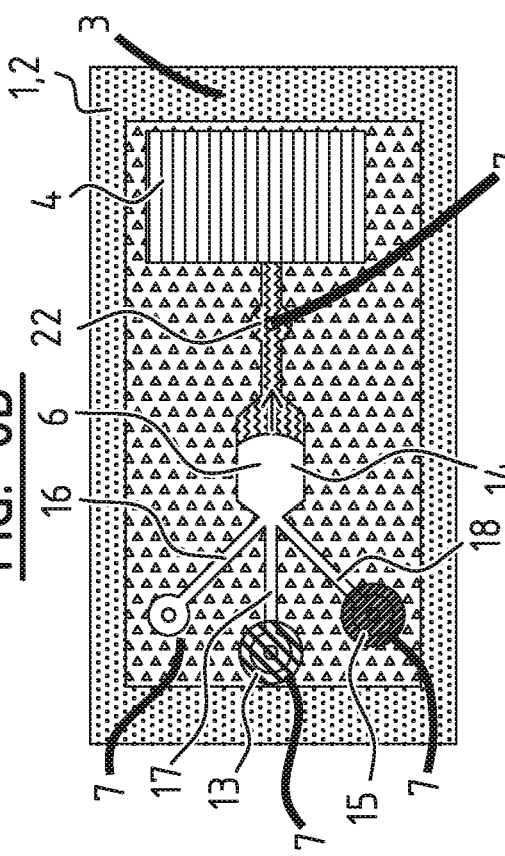

The embodiment of FIGS. 6a-6d is similar to the embodiment of FIG. 5 and differs there from only in that an additional stop valve 22 is provided between reaction zone 14 and blotting pad 4. By providing the extra stop valve 22 the residence time of each liquid 6, 13, 15 in reaction zone 14 is adjustable, independent of the flow time of the liquid through the reaction zone 14. In FIG. 6a none of the liquid containers is triggered. In FIG. 6b the liquid container containing first liquid 6 is triggered. Liquid 6 will flow through channel 16 and reaction zone 14 up to the extra stop valve 22. The liquid 6 will remain in reaction zone 14 until stop valve 22 is triggered, see FIG. 6c. After triggering the extra stop valve 22 liquid 6 will flow to blotting pad 4. By adjusting the residence time of a liquid in reaction zone 14 more or less time for chemical reactions may be provided.

For a further description of the embodiment of FIGS. 6a-6d the reader is referred to the description of FIG. 5.

FIG. 7 shows a type of biochemistry assay, so called enzyme-linked immunosorbent assay (ELISA), for which the device according to the invention may be used. In reaction zone 14 at least one antibody 30 with specificity for a particular antigen is provided. The sample with an unknown amount of antigen 31 is immobilized specifically via capture by another antibody specific to the same antigen, in a "sandwich" ELISA. After the antigen 31 is immobilized, the detection antibody 32 is added, forming a complex with the antigen 31. The detection antibody can be covalently linked to an enzyme, or can itself be detected by a secondary antibody 33 that is linked to an enzyme through bioconjugation. Between each step, the plate is typically washed with a mild detergent solution to remove any proteins or antibodies that are not specifically bound. After the final wash step, the plate is developed by adding an enzymatic substrate to produce a visible signal, which indicates the quantity of antigen in the sample. The various samples with antigens 31, detection antibodies 32 and secondary antibodies 33, and the washing liquid(s) may be contained in a respective liquid container of the device. After triggering of the respective stop valve thereof a sample or a washing liquid will flow through reaction zone 14, such that the above described steps of ELISA may take place. By triggering the stop valves of the liquid containers consecutively in the desired order, at desired moments, and optionally with desired residence time in the reaction zone, ELISA may be performed as desired. The number of liquid containers may easily be adapted to the type of assay. The voltage to be applied for triggering a capillary-stop valve is dependent on several parameters. The required voltage is dependent on for example, but not limited thereto, the type of liquid 6, 13, 15, the size of the gap 24, the material and diameter of the capillary-stop valve 22.

It is noted that the figures explain the invention with respect to a capillary valve. It is clear for the skilled person that the invention also applies to a hydrophobic valve, which both type of valves are defined by the term capillary-stop valve.

It is further noted that the invention is not limited to the above discussed exemplary embodiments but also extends to other variants within the scope of the appended claims.

For example, the skilled person will appreciate that each desired configuration and/or number of first and/or second liquid containers and/or stop valves with respective pair(s) of electrodes may be chosen.

The invention claimed is:

1. A device comprising:
two or more first liquid containers, a first of the first liquid container receiving a first liquid and a second of the first liquid container receiving a second liquid,
two or more capillary-stop valves, a first of the capillary-stop valves in fluid through flow connection with the first of the first liquid containers receiving the first liquid to stop said first liquid from flowing out of the first of the first liquid containers via said first of the capillary-stop valves and a second of the capillary-stop valves in fluid through flow connection with the second of the first liquid containers receiving the second liquid for stopping said second liquid from flowing out of the second of the first liquid containers via the second of the capillary-stop valves,
a second liquid container, wherein the second liquid container comprises an absorber and a reaction zone;
a first pair of electrodes arranged such that in use a first electrode of the first pair of electrodes is in contact with said first liquid in the first of the first liquid containers and a second electrode of the first pair of electrodes spaced apart from the first capillary-stop valve by an electrically insulating medium gap;
a second pair of electrodes arranged such that in use a first electrode of the second pair of electrodes is in contact with said second liquid in the second of the first liquid containers and a second electrode of the first pair of electrodes spaced apart from the second of the capillary-stop valve by an electrically insulating medium gap, and
at least one voltage source connected to each pair of said first and second pairs of electrodes and which is activatable for applying an electric potential difference independently at each pair of electrodes such that the first and second liquids in the respective first and second of the first liquid containers is attracted in the direction of the second electrode of the respective pair of electrodes to overcome the stopping effect of the respective first and second capillary-stop valve and separately discharge the first or second liquid from the respective first and second of the first liquid containers via the respective first and second capillary-stop valve;
wherein each of the first and second of the first liquid containers is in fluid through flow connection with the second liquid container, the second liquid container receiving the first liquid or the second liquid from the respective first or second of the first liquid containers via the respective first or second capillary-stop valve.

2. The device according to claim 1, wherein at least one of the first and second of the first liquid containers is a channel, a capillary channel, a reservoir, or a well of a microtiterpolate volume.

3. The device according to claim 1, wherein said second liquid container further comprises a channel, a capillary channel, or a reservoir.

4. The device according to claim 1, wherein at least one of the first and second capillary-stop valves is arranged relative to the second liquid container such that the flow direction of the liquid in the capillary-stop valve is substantially orthogonal to the flow direction of the first or second liquid in the second liquid container.

5. The device according to claim 1, wherein the device comprises a first substrate comprising at least one of the first and second of the first liquid containers and a second substrate comprising the second liquid container.

6. The device according to claim 5, wherein the second substrate is made of an electrically conductive material for forming said second electrode.

7. The device according to claim 5, wherein said second substrate is made of an electrically insulating material comprising a patterned or unpatterned electrically conductive layer for forming said second electrode.

8. The device according to claim 7, wherein said electrically conductive layer is arranged on a side of the insulating material that is facing towards or away from said first electrode.

9. The device according to claim 5, wherein said first substrate is made of glass, silicon, ceramic or polymer.

10. The device according to claim 1, further comprising:
a third capillary-stop valve that is in fluid through flow connection with said second liquid container for stopping the first liquid or the second liquid in said second liquid container from flowing out of said second liquid container via said third capillary-stop valve;

a third pair of electrodes arranged such that in use a first electrode of the third pair of electrodes is in contact with the first liquid or the second liquid in the second liquid container, and a second electrode of the third pair of electrodes spaced apart from the third capillary-stop valve by an electrically insulating medium gap, wherein said at least one voltage source is connected to the third pair of electrodes and which is activatable such that an electric potential difference can be applied at the third pair of electrodes.

11. The device according to claim 10, wherein one electrode of the first, second, or third pairs of electrodes is integrally formed with another electrode of a different pair of the first, second, or third pairs of electrodes.

12. A method for activating a capillary-stop valve of a device, said method comprising the step of:

(a) applying an electric potential difference at two mutually cooperating electrodes, wherein a first electrode is in contact with a liquid that is stopped by a capillary-stop valve, and wherein a second electrode is spaced apart from said capillary-stop valve, such that the liquid is attracted in the direction of said second electrode so as to allow the liquid to overcome the stopping effect of the capillary-stop valve, and comprising the step, to be performed before step (a), of:

(b) providing a device according to claim 1, wherein step (a) is performed by applying the electric potential difference at each pair of the first and second electrodes.

13. The method according to claim 12, wherein step (a) is performed for each pair of first and second electrodes or pair of second first and second electrodes independent of the other pair(s).

* * * * *